United States Patent [19]

Bentley

[11] Patent Number: 4,787,010

[45] Date of Patent: Nov. 22, 1988

[54] IMPREGNATION AND ENCAPSULATING MATERIAL

[75] Inventor: Jeffrey A. Bentley, Riverside, R.I.

[73] Assignee: Aerovox Incorporated, New Bedford, Mass.

[21] Appl. No.: 870,717

[22] Filed: Jun. 4, 1986

[51] Int. Cl.[4] .................. H01G 4/22; H01G 3/17; H01G 9/00

[52] U.S. Cl. .................. 361/315; 361/323; 361/433

[58] Field of Search ............ 361/433, 272, 311–316, 361/318, 319, 323, 306, 307, 433 S; 264/272.11, 272.18, 272.21; 252/62.3 Q; 174/52 PE; 29/25.42

[56] References Cited

U.S. PATENT DOCUMENTS

| 2,719,182 | 9/1955 | Ross et al. |
| 2,931,961 | 2/1955 | Robinson. |
| 2,940,025 | 6/1960 | Markarian ................. 361/315 |
| 3,277,350 | 10/1966 | Pearce et al. .............. 361/433 |
| 3,277,354 | 10/1966 | Ikeda et al. ............... 361/312 |
| 3,402,237 | 9/1968 | Holzinger. |
| 3,430,116 | 2/1969 | Johnstone. |
| 3,585,468 | 6/1971 | Chertok et al. ............ 361/323 |
| 3,608,023 | 9/1971 | Scarborough ........... 264/272.11 X |
| 3,996,505 | 12/1976 | Lapp et al. . |
| 4,020,214 | 4/1977 | MacKenzie, Jr. . |
| 4,348,712 | 9/1982 | Newcomb. |
| 4,577,257 | 3/1986 | Erhardt et al. ............ 361/433 |

FOREIGN PATENT DOCUMENTS

| 30229 | 6/1981 | European Pat. Off. ...... 361/313 |
| 16655 | 2/1977 | Japan ........................ 361/314 |
| 52-22760 | 3/1977 | Japan. |
| 49451 | 4/1977 | Japan ........................ 361/316 |
| 705472 | 3/1954 | United Kingdom ........ 361/315 |
| 991449 | 5/1965 | United Kingdom. |

Primary Examiner—Donald A. Griffin

[57] ABSTRACT

A capacitor in which the capacitive element is impregnated and encapsulated by a composition having a softening point above the normal operating temperature of the capacitor and below the temperature that would occur following a failure of the capacitive element (or in another aspect below the temperature at which the polypropylene film of a polypropylene film capacitor shrinks). In other aspects the composition is a blend of polybutene and polyethylene; and a method of impregnating a capacitor is provided.

21 Claims, 1 Drawing Sheet

IMPREGNATION AND ENCAPSULATING MATERIAL

BACKGROUND OF THE INVENTION

This invention relates to impregnation and encapsulation of capacitors.

Dry capacitors are generally constructed by encapsulating the capacitor winding in a rigid material such as epoxy or polyurethane. Wet capacitors, on the other hand, are typically encapsulated by a dielectric liquid, such as polybutene (Lapp et al., U.S. Pat. No. 3,996,505). Wet capacitors are typically housed in sealed cans and include pressure sensitive interruption devices that operate on gas pressure built up within the can as the capacitor begins to fail.

Siemens et al., British patent No. 191,449, describes a capacitor impregnated with a mixture of low molecular weight polyisobutylene and lanosterol.

Holzinger, U.S. Pat. No. 3,402,237, describes a thermosetting composition for encapsulating electrical conductors. The composition is a mixture of isobutylenes, conjugated drying oils, liquid extenders, solid particulate extenders, and a catalyst.

Another thermosetting composition, described in MacKenzie, U.S. Pat. No. 4,020,214, consists of a mixture of ethylene containing polymers, a cross-linking curing agent, a mineral filler, and an organic titanate.

SUMMARY OF THE INVENTION

A general feature of the invention is a capacitor that includes a capacitive element and a dielectric impregnating composition having a softening point which is above the normal operating temperature and below the temperature that would occur following a failure of the capacitive element.

Another general feature of the invention is a capacitor having a polypropylene film capacitive element and a dielectric impregnating composition having a softening point above the normal operating temperature and below the temperature at which the polypropylene film shrinks.

Another general feature of the invention is a capacitor impregnating composition that is a blend of polybutene and polyethylene.

Preferred embodiments include the following features. The operating temperature is from −40° to +100° C. The minimum average molecular weight of the composition is 800. The minimum average molecular weights of the polybutene and polyethylene are respectively 800 and 1000. The composition comprises at least 70% polybutene and at most 30% polyethylene. The density of the composition is between 0.8 and 0.9 g/cm³ at 115° C. and its drop point is between 90° C. and 105° C. In some embodiments, the capacitor includes means for disconnecting the capacitor after it begins to fail; in embodiments, the capacitor does not include such means.

Another general feature of the invention is a method of impregnating and encapsulating a capacitor by softening the composition, impregnating the capacitor and, then cooling the capacitor below its softening point.

The composition has the properties of the polybutene which serves as one component, while providing a "dry" impregnant. A pressure-sealed capacitor can be formed in a "dry" condition and still permit proper operation of a pressure-sensitive interrupter that is triggered by internal gas pressure. The composition will not attack the polypropylene film of a metallized polypropylene capacitor and will not shrink the polypropylene during impregnation.

Other features and advantages of the invention will be apparent from the following description of the preferred embodiment, and from the claims.

DESCRIPTION OF THE PREFERRED EMBODIMENT

Figure 1:
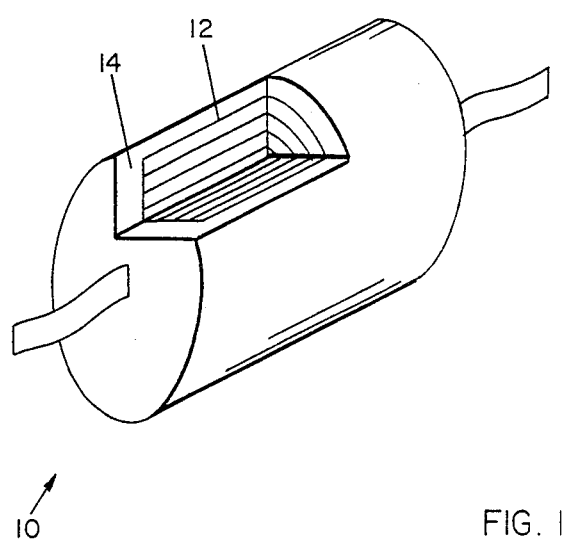

We first briefly describe the drawings.

Drawings

FIG. 1 is an isometric cutaway diagram of a capacitor.

COMPOSITION AND USE

Polybutenes suitable for this invention have been described in Bentley, U.S. patent application Ser. No. 762,542, filed Aug. 2, 1985, entitled Electrical Capacitor, assigned to the same assignee as this application, and hereby incorporated by reference. Briefly, they are high molecular weight polybutene, such as polybutene sold under the mark, H-300 or H-1500, manufactured and sold by Amoco Chemicals Company. Preferably the molecular weight is above 800.

Polyethylenes suitable for this invention are preferably any with a high molecular weight (above 1000), for example, AC-6 from Allied Corporation. Further examples of such polyethylenes include the homopolymers, oxidized homopolymers, high density oxidized homopolymers, micronized polyethylene waxes and acrylic acid or vinyl acetate copolymers distributed by Allied Corporation.

In general the polybutene and polyethylene are blended together to produce a composition having properties within the ranges listed in the table below. The important features of this blend include an average molecular weight no smaller than 800, and a softening point above the normal operating temperature of the capacitor and below the temperature that would occur following a failure of the capacitor element, e.g., a softening point between 90° C. and 105° C. The molecular weights and relative percentages of the polybutene and polyethylene components are balanced to achieve the desired properties. Higher percentages of polybutene yield lower softening points. Thus, for example, a very high molecular weight polybutene can be blended with a low molecular weight polyethylene, and vice versa, or polymers of average molecular weight, for example, around 800 can be blended. The density of the blend is chosen to reduce the cost of the blend.

TABLE

| Property | Units | Method of Measurement | Range Desired |
|---|---|---|---|
| Density | gm/cm³ | ASTM D1238, at 115° C. | 0.8–0.9 |
| Flash Point | °C. | ASTM D92, open cup | ≧175 |
| Viscosity | cSt | ASTM D445, at 115° C. | 75–90 |
| Work drop Point | °C. | ASTM D217 and D566 | 90–105 |
| Av. Mol. Wt. | Daltons | ASTM D2503 | >800 |
| Dielectric Constant | — | ASTM D924, at 60 Hz, 20° C. | ≧2.3 |
| Power factor | % | ASTM D924, at 60 Hz, 100° C. | ≦0.5 × $10^{-2}$ |
| Resistivity | Ohm-Cm/min | ASTM D1169, at 100° C. | ≧1 × $10^{15}$ |
| Dielectric Strength | KV | ASTM D877, 25° C. | ≧20 |

TABLE-continued

| Property | Units | Method of Measurement | Range Desired |
| --- | --- | --- | --- |
| Water content | ppm | ASTM D1533 | ≦100 |
| Acidity | mg KOH/gm | ASTM D974 | ≦0.2 |
| Inorganic chlorides and sulfates | | ASTM D877 | 0 |
| Total sulfur | % | ASTM 1552 | ≦0.2 |

The blend preferably also contains, by volume, 0.7% epoxide (Union Carbide ERL 4221, having the chemical name 3,4 epoxycyclohexylmethyl 3,4 epoxy cyclohexane carboxylate) and 0.1% antioxidant (Shell Corp. Ionol, having the chemical name 2, 6 di-tert-butyl 4-methylphenol).

The final properties of the composition are determined not only by the ingredients, but also by the environmental conditions of its formation. Factors, such as mechanical and thermal stress, can affect the cohesion of the crystal lattice structure of the blend. More stable compositions are formed by cooling the blend slowly (e.g., at a rate in the range of ½° C. per min. to 2° C. per min.) after mixing, resulting in a material with high plasticity and more flexibility. The slow cooling following blending, impregnation, and encapsulation ensures good crystallization which results in higher plasticity. This reduces the risk that, as a result of brittle fracture, the capacitive element may become exposed to external environmental conditions, hastening its failure.

EXAMPLE 1

Amoco polybutene H-300 and Allied Chemical AC-6 polyethylene are blended in the proportions of 70% to 30% respectively, by mixing (stirring) at a temperature of 121° C until homogenous. The softening point was measured to be 102° C.

EXAMPLE 2

Amoco polybutene H-1500 (85%) and Allied Chemical AC-6 polyethylene (15%) are mixed at 121° C. until homogenous. The softening point was measured to be 100° C.

The blends of the above two examples have coefficients of cubic expansion averages near that of polybutene, i.e. $6.6 \times 10^{-4}$ cc/°C. at 100° C. This property allows the manufacturer to fill a capacitor with the blends at a high temperature, without worry about significant shrinking of the blend when cooled to a lower temperature. Thus, voids are not created (or are reduced) within the capacitor during cooling. Voids would be detrimental to the capacitors since they affect the corona activity in the capacitor winding. The absence of voids helps to maintain the capacitance stability during the life of a capacitor.

The blends described above are non-draining (semi-solid) and have the appearance of stiff white greases with the chemical, physical and electrical properties of the polybutene from which they were formulated. These blends solidify at normal working temperatures of between −40° C. and 100° C., but will soften when the capacitor has local hot spots, for example, when it has aged and entered a failure mode. That is, local increases in temperature (above the softening point) within the capacitor will soften the blend and allow the escape of gases. This increases the useful life of the capacitor and allows explosions to be prevented by using pressure-sensitive interruption mechanisms. The blends also resist shrinkage and thus embrittling and cracking during use at normal field application temperatures and are thus generally useful in any dry metallized polypropylene, rolled capacitors, whether or not protected by a pressure-sensitive interruption mechanism.

The softening point of the blend should be below the temperature at which the polypropylene film begins to shrink. To impregnate the capacitor, the blend is heated above its melting temperature, and the capacitor is vacuum impregnated by conventional techniques, then cooled to a solid state.

Referring to FIG. 1, the impregnated and encapsulated capacitor 10 includes a rolled capacitive element 12, embedded in the dielectric blend 14.

Further detail concerning the construction of a capacitor protected by a pressure-sensitive interruption mechanism (that disconnects the capcitor after it begins to fail) and impregnated by a blend of the kind described above is set forth in U.S. patent application Ser. No. 870,623, Bentley et al., titled Capacitor Circuit Interruption, filed on the same day as this application, assigned to the same assignee, and incorporated herein by reference.

Other embodiments are within the following claims.

I claim:

1. A capacitor comprising
   a capacitive element,
   a dielectric impregnating composition impregnating said element and having a softening point above the normal operating temperature of said capacitor and below the temperature that would occur following a failure of said capacitive element, the softening of said composition during failure of said capacitive element aiding the release of gases, and
   means for disconnecting said capacitor after it begins to fail, said disconnecting being aided by said release of gases.

2. A capacitor comprising
   a capacitive element comprising a polypropylene film, and
   a dielectric impregnating composition impregnating said capacitve element and having a softening point above the normal operating temperature of said capacitor, and below the termperature at which said film shrinks.

3. The capacitor of claim 1 or 2 wherein said normal operating temperature is from −40° to +100° C.

4. The capacitor of claim 1 or 2 wherein said composition includes polybutene.

5. The capacitor of claim 4 wherein said composition further comprises polyethylene.

6. The capacitor of claim 5 wherein the minimum average molecular weight of said polyethylene is 1000.

7. The capacitor of claim 2, said impregnating composition having a softening point below the temperature that would occur following a failure of said capacitive element, the softening of said composition during failure of said capacitive element aiding in the release of gases,
   said capacitor further comprising means for disconnecting said capacitor after it begins to fail, said disconnecting being aided by said release of gases.

8. The capacitor of claim 1 or 7 wherein said means for disconnecting comprises a pressure-sensitive interrupter.

9. A capacitor comprising
   a capacitive element including a dielectric sheet, and a dielectric impregnating composition impregnating said element and comprising a blend of polybutene and polyethylene.

10. The capacitor of claim 9 wherein the minimum average molecular weight of said composition is 800.

11. The capacitor of claim 10 wherein the minimum average molecular weight of said polybutene is 800.

12. The capacitor of claim 4 or 9 comprising at least 70% polybutene.

13. The capacitor of claim 5 or 9 comprising at most 30% polyethylene.

14. The capacitor of claim 5 or 9 wherein said polybutene and said polyethylene are in a homogenous mixture.

15. The capacitor of claim 5 or 9 wherein the density of said composition is between 0.8 and 0.9 g/cm$^3$ at 115° C.

16. The capacitor of claim 5 or 9 wherein the melt point of said composition is between 90° C. and 105° C.

17. The capacitor of claim 1, 2, or 9 characterized in not including means for disconnecting said capacitor after it begins to fail.

18. A method of impregnating and encapsulating a capacitor, said method comprising
providing said capacitor with a capacitive element comprising a polypropylene film,
providing a composition having a softening point above the normal operating temperature of said capacitor and below the temperature at which said film shrinks,
softening said composition,
impregnating said capacitor with said composition, and
cooling said capacitor below said softening point.

19. A capacitor comprising
a capacitive element, and
a dielectric composition encapsulating said capacitive element and comprising a blend of polybutene and polyethylene.

20. A method of aiding the disconnection of a capacitor, said method comprising
providing a capacitor having a capacitive element impregnated with a dielectric impregnating composition having a softening point above the normal operating temperature of said capacitor and below the temperature that would occur during a failure of said capacitive element, and means for disconnecting said capacitor after it begins to fail,
aging said capacitor until it begins to fail, the failure of said capacitor causing the temperature of said capacitor to increase to above the normal operating temperature of said capacitor, said increases in temperature resulting in the softening of said composition, assisting in the release of gases that aid in said disconnecting.

21. The method of claim 18 or 20 wherein said means for disconnecting comprises a pressure-sensitive interrupter.

* * * * *

Disclaimer 4,787,010—Jeffrey A. Bentley, Riverside, R.I. IMPREGNATION AND ENCAPSULATING MATERIAL. Patent dated November 22, 1988. Disclaimer filed December 7, 2000, by the assignee, Aerovox Incorporated.

Hereby enters this disclaimer to claim 9 of said patent.

*(Official Gazette, May 1, 2001)*